United States Patent
Kutcher

(10) Patent No.: US 6,301,615 B1
(45) Date of Patent: Oct. 9, 2001

(54) CLUSTER PERFORMANCE MONITORING UTILITY

(75) Inventor: Jeffrey Kutcher, Spring, TX (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/172,431

(22) Filed: Oct. 14, 1998

(51) Int. Cl.[7] .................................................. G06F 15/173
(52) U.S. Cl. ........................ 709/224; 709/200; 709/220; 707/10
(58) Field of Search .............................. 379/26; 702/182, 702/187; 707/10; 709/200, 224, 220; 714/25

(56) References Cited

U.S. PATENT DOCUMENTS

| | | | | |
|---|---|---|---|---|
| 5,621,892 | * | 4/1997 | Cook ........................................ | 709/224 |
| 5,696,701 | * | 12/1997 | Burgess et al. ............................ | 714/25 |
| 5,742,762 | * | 4/1998 | Scholl et al. ............................. | 709/200 |
| 5,758,071 | * | 5/1998 | Burgess et al. .......................... | 709/220 |
| 5,771,274 | * | 6/1998 | Harris ...................................... | 379/26 |
| 5,796,633 | * | 8/1998 | Burgess et al. .......................... | 702/187 |
| 5,819,028 | * | 10/1998 | Manghirmalani et al. . | |
| 5,835,705 | * | 11/1998 | Larsen et al. . | |
| 5,875,420 | * | 2/1999 | Piety et al. ............................... | 702/182 |
| 5,878,420 | * | 3/1999 | Salle ........................................ | 707/10 |
| 6,115,393 | * | 9/2000 | Engel et al. . | |

OTHER PUBLICATIONS

"Performance Toolbox Version 1.2 and 2 for AIX: Guide and Reference (PowerPC Platform Only)", IBM.*

* cited by examiner

*Primary Examiner*—David Wiley
*Assistant Examiner*—Firmin Backer
(74) *Attorney, Agent, or Firm*—Conley, Rose & Tayon, PC; B. Noël Kivlin

(57) ABSTRACT

A system and method for monitoring the performance of one or more computers on a network. The system and method utilize the standard output of preexisting performance monitoring utilities and filters this output to transform the data into a standardized format which may consist of key-value pairs. The reformatted data is provided to one or more clients for analysis. Separate threads are used to independently redirect the output of individual utilities to a superserver via associated sockets. The superserver uses a filter associated with a particular utility to reformat the data received from a socket corresponding to that utility. The system and method may be used to monitor varying numbers of computers and each computer may have varying numbers of preexisting utilities executed thereon.

16 Claims, 4 Drawing Sheets

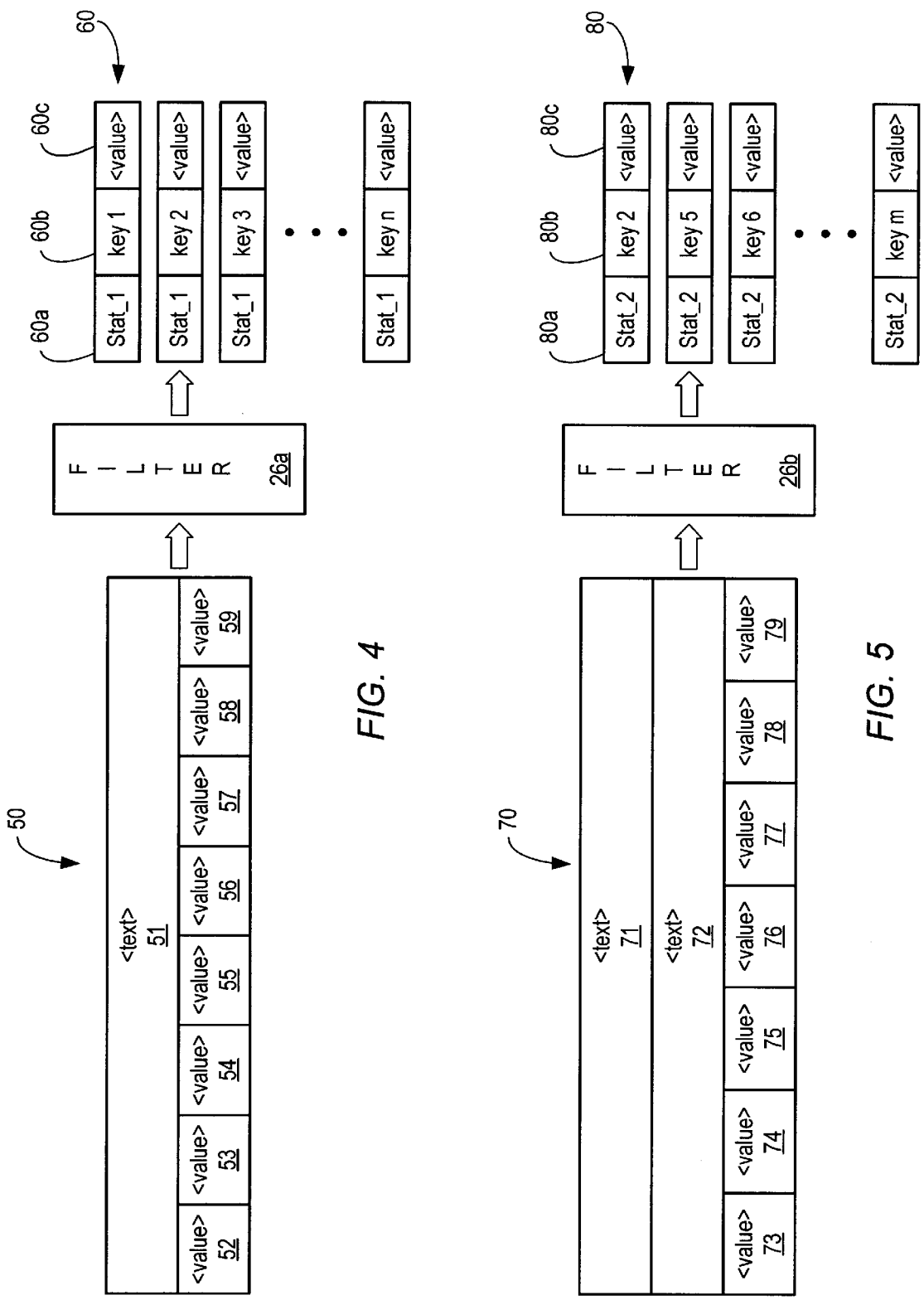

CLUSTER PERFORMANCE MONITORING UTILITY

BACKGROUND OF THE INVENTION

1. Field of the Invention

The present invention relates generally to computer systems and more specifically to a method and system for monitoring the performance of a cluster of computers as measured by a variety of preexisting monitoring utilities.

2. Description of the Relevant Art

As a result of the increased power and reduced cost of personal computers, they have become increasingly common in homes and businesses. While individual computers enable users to accomplish computational tasks which would otherwise be impossible by the user alone, the capabilities of the individual computer can be multiplied by using it in conjunction with one or more other computers. Individual computers are therefore commonly coupled together to form a computer network.

Computer networks may be interconnected according to various topologies. For example, several computers may each be connected to a single bus, they may be connected to adjacent computers to form a ring, or they may be connected to a central hub to form a star configuration. These networks may themselves serve as nodes in a larger network. While the individual computers in the network are no more powerful than they were when they stood alone, they can share the capabilities of the computers with which they are connected. The individual computers therefore have access to more information and more resources than standalone systems. Computer networks can therefore be a very powerful tool for business, research or other applications.

Computer networks have become fundamental to the functioning of many businesses. The networks facilitate the distribution and tracking of information throughout the office(s) and allow centralized administration of the computer resources. In order to properly administer the functions of the computer network, it may be necessary to monitor the performance of the network. It may also be useful to have means to monitor the performance or resource usage of individual machines on the network. It is therefore preferable that this monitoring of the computers can be done at the level of the network or at the level of the individual computers on the network. Although the individual computers on the network must communicate using a common protocol, the individual machines may be of several different types and may, for example, even use different operating systems. Similarly, the individual computers may each have different performance monitoring utilities which are resident within the respective computers. These utilities obtain performance data from the operating systems and make the data available to the user, usually by displaying this information on a computer's monitor. A network administrator may thereby access various performance measures for each of the machines.

When the network administrator accesses the performance data for the individual machines, it is often the case that there is not a single performance monitoring utility which is common to all the machines. The different utilities may not even output the same type of data (e.g., CPU utilization.) The network administrator may be presented with a jumble of individual and possibly unrelated pieces of information. It may therefore be difficult to determine the overall performance of a particular cluster or the network as a whole.

A network administrator who wishes to consolidate performance information for a cluster of computers may encounter difficulties in obtaining suitably formatted data. Because non-identical computers may have different performance monitoring utilities, the data available from the different computers may be different, or the utilities may generate the same data in different formats. Even different version of the same utilities may have several formats. It is therefore difficult, if not impossible, to simply combine the outputs of the utilities. It is also difficult to develop new utilities for the purpose of monitoring the computers because of the cost of developing the code. Further, different versions of operating systems may rename data variables or make other changes which would prevent the new utility from functioning properly. Utilities designed to extract data from all possible types of computers would therefore have to be updated almost continuously in order to match the updates of the various computers' operating systems.

SUMMARY OF THE INVENTION

One or more of the problems outlined above may be solved by the system and method of the present invention. The invention utilizes preexisting performance monitoring utilities. The output of these utilities is filtered to provide information to a client in a standardized format which facilitates the assessment of performance in both individual computers and selected groups of computers The standardized format of the data allows the client to selectively view particular performance indicators for individual computers or clusters of computers on the network In one embodiment, the system is implemented on a network of computers. One or more performance monitoring utilities is executed on each of several computers of interest. The performance monitoring utilities extract data from the respective computers and output the data to the standard output. A run command server is also executed on each of these computers. The run command server accepts the data output by the performance monitoring utilities and directs the data to a superserver which is concurrently executed on one of the computers connected to the network. The superserver takes data from each of the performance monitoring utilities on each of the machines and filters it. Each performance monitoring utility has a particular filter associated with it. The filter converts the output of the respective performance monitoring utility into a format which consists of a series of key-value pairs. The keys are predefined and are incorporated into the filters. The set of key-value pairs generated by a filter for a particular performance monitoring utility may include only a subset of all the available keys. The key-value pairs generated for the performance monitoring utilities are then made available to a client which can use selected ones to determine the performance of the computers. The client can select data for individual computers or for clusters of computers. The client can view data corresponding to individual keys, consolidate data relating to particular performance parameters, or otherwise manipulate the data to gauge system performance.

BRIEF DESCRIPTION OF THE DRAWINGS

Other objects and advantages of the invention will become apparent upon reading the following detailed description and upon reference to the accompanying drawings in which:

FIG. 4 is an illustration of the filtering of output data from a first performance monitoring utility into key-value pairs.

FIG. 5 is an illustration of the filtering of output data from a second performance monitoring utility into key-value pairs.

Figure 1:
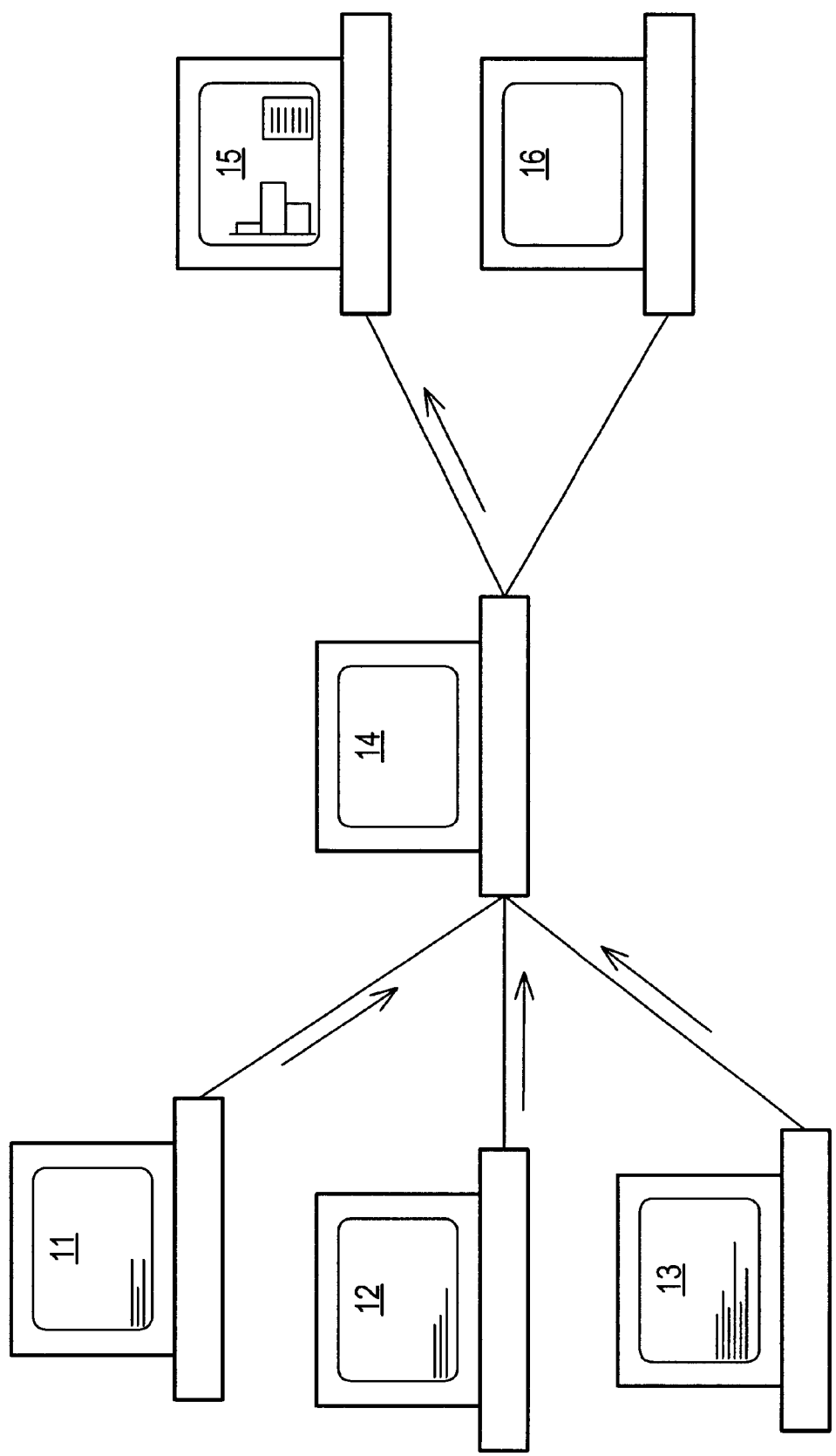
FIG. 1 is an illustration of one computer network in which the invention may be implemented.

While the invention is susceptible to various modifications and alternative forms, specific embodiments thereof are shown by way of example in the drawings and will herein be described in detail. It should be understood, however, that the drawing and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

One embodiment of the invention is described in detail below. The invention is implemented on a network of interconnected computers. Various ones of the computers are configured to execute performance monitoring utilities, a run command server, a superserver and a client application. The performance monitoring utilities are executed on several computers for which performance data is desired. These computers may be referred to as "target" computers. On each of these computers, another software application is also executed. This application is referred to herein as a "run command server". The run command server takes the output of the performance monitoring utilities and causes it to be transmitted to a computer which is executing a software application which is referred to herein as a "superserver". This computer may be referred to as the "filtering" computer. The superserver accepts the data from the run command servers and filters the data. Each of the performance monitoring utilities has a particular filter associated with it, and this filter is used by the superserver to transform the data generated by the associated performance monitoring utility into a standardized format. This format consists of a series of key-value pairs. The key represents the type of data. The value is that generated by the performance monitoring utility or calculated from the output of the utility. A particular performance monitoring utility may not generate the same performance data as another performance monitoring utility, so the key-value pairs for the particular application may contain only a subset of all the possible keys. The key-value pairs generated for all of the performance monitoring utilities on all of the selected computers are made available to client applications. These client applications can then manipulate and display the standardized data. The client applications execute on what may be referred to as "client" computers.

Referring to FIG. 1, the network includes a plurality of computers 11–13 whose performance is to be determined. Computers 11–13 are coupled to another computer 14 which is host to a server application that converts the raw performance data from computers 11–13 into a format suitable for comparison or determination of overall performance. (This server application is referred to herein as the superserver.) Computer 15 hosts a client application which performs the comparison, consolidation or other manipulation of the reformatted data. Other computers (e.g., 16) may be connected to the network, yet may have no involvement with the performance monitoring.

It should be noted that the particular arrangement of computers in the network is not important. The configuration shown in FIG. 1 is exemplary and may be replaced with any network configuration. In fact, it is not necessary that all of the computers described above be separate. That is, a single computer may be one of the machines whose performance is to be monitored and at the same time it may host a client application which monitors network performance. Likewise, the superserver may be executing on the same computer as a run command server or a client. Thus, a single computer may be considered a network for the purposes of this disclosure. It should also be noted that the computers may be interconnected in a different manner. They may be directly connected to each other or they may be linked through other networks or other computers.

The computers in the network may be of a number of different types. They may run UNIX, DOS or other operating systems. Each of the computers whose performance is to be monitored has at least one performance monitoring utility (also referred to as a performance monitoring tool, a statistical tool, etc.) which is configured to obtain performance data from the operating system and route the data to the standard output of the computer (e.g., "cout" in the C++ programming language). The default standard output for the computer is the computer's monitor. Thus, the data is normally displayed to the user of the machine. The standard output can, however, be redirected.

The system takes advantage of preexisting performance monitoring utilities. ("Preexisting" as used here does not mean that these utilities had to exist before the invention, but instead simply means that these utilities are independent of the invention.) Because of the need to monitor a wide range of computers, development of a single utility which could access the appropriate data in all of the computers of interest would be daunting. An enormous team of developers would be necessary in order to amass the required knowledge of each type of computer and operating system. Further, the utility would have to be updated whenever any one of the operating systems was updated.

Preexisting utilities, however, are often packaged with the operating system of the computer, so if the operating system is changed in a way which would affect the utilities, revised versions of the utilities are normally included with the operating system update. New versions of the utilities generally maintain the same data output format. By utilizing the output of these utilities, the system of the invention avoids the necessity of constant updating to match changes in the various operating systems. The only updating necessitated by changes in the target computers is the updating of filters corresponding to a particular performance monitoring utility (and corresponding output format) if the output format of the utility changes. Because the filters operate on the output data, and because changes in the output data are readily apparent, the filters are easily updated.

Figure 2:
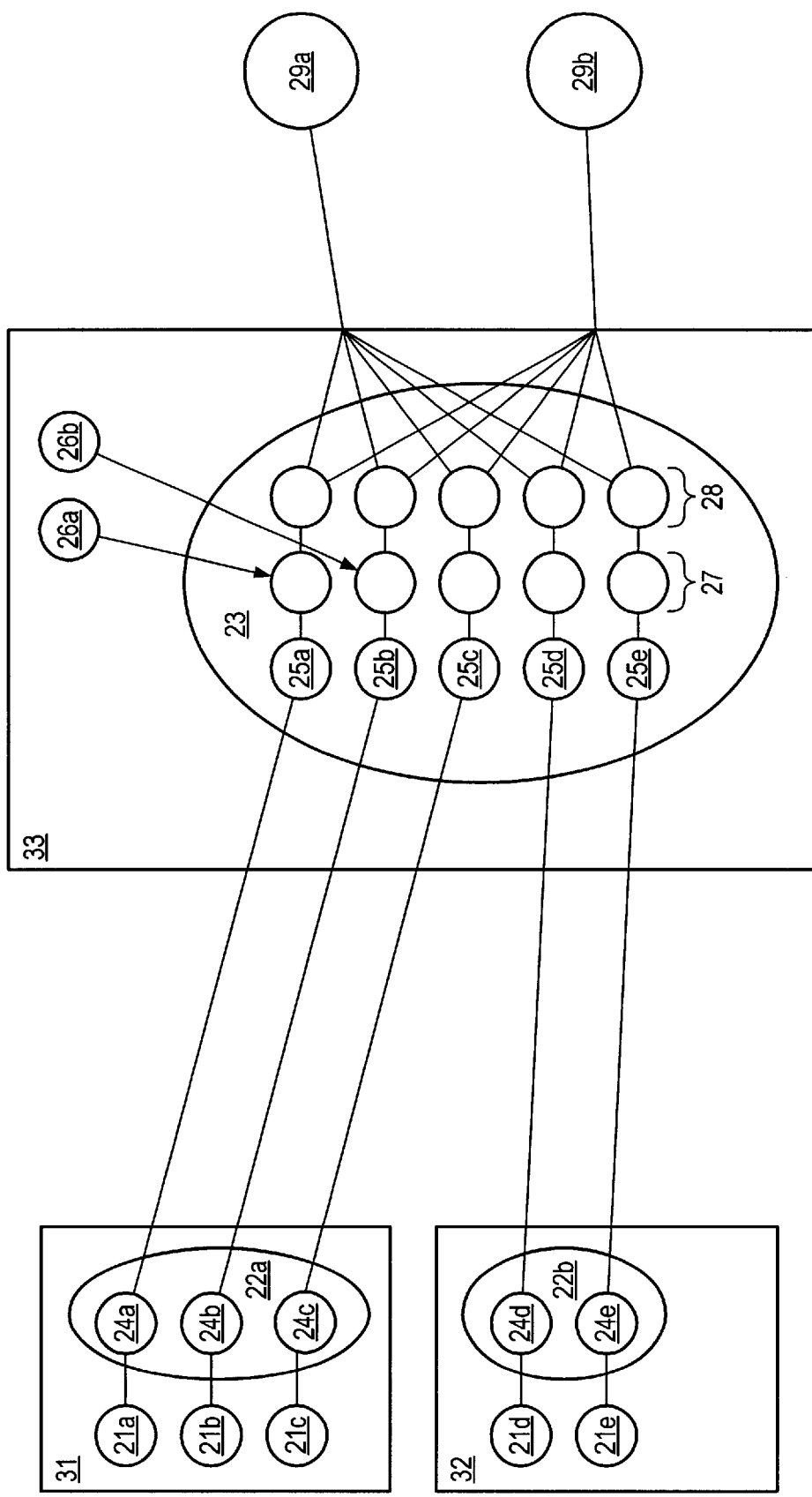
FIG. 2 is a block diagram illustrating the functional components of one embodiment of the invention.

Referring to FIG. 2, a block diagram illustrating the functional components of one embodiment of the invention is shown. In addition to the performance monitoring utilities 21, each of computers 31 and 32 executes a run command server 22. (For the sake of brevity, similar items in the figures are given the same reference number, followed by a letter, e.g., "21a". Use herein of the numeral alone connotes the items collectively or individually, as indicated by the text used therewith.) Run command server 22 is a software application that takes the output of each of the performance monitoring utilities 21 and directs the output to the computer which is running superserver 23. Run command server 22 creates a separate thread 24 corresponding to each executing performance monitoring utility. (Threads are independent units of execution within a process.) When each performance monitoring utility is started, its output is redirected to run command server 22. Run command server 22 creates a new thread 24 to handle the out put of the performance monitoring utility. Thread 24 takes the output from the utility and directs this data to a corresponding thread 25 in superserver 23.

Superserver 23 is a software application that takes the output of the performance monitoring utilities and filters the data according to a selected filter 26. Superserver 23 creates a thread 25 corresponding to each thread 24 in run command server 22. Each thread 25 receives a stream of data corresponding to a particular performance monitoring utility and passes the data to a corresponding thread 27. Thread 27 filters the data according to a filter 26 which is associated with the particular performance monitoring utility that generated the data. (Although each thread 27 filters the received data, for the sake of clarity the figure only shows filters for two of the threads.) thread 27 then passes he filtered data to thread 28, which makes it available to clients 29. Clients 29 provide users with means to manipulate and display selected data.

Performance monitoring utilities 21 may be any of a number of utilities such as iostat, vmstat, mpstat, auditstat, lockstat, sar, netstat, nfsstat, nisstat, etc. Any statistical utility that displays to standard output can be used. Each of these utilities typically produces a different output. For example, iostat produces the output lines:

| tty | | fd0 | | | sd0 | | | sd3 | | | sd5 | | | cpu | | | |
|---|---|---|---|---|---|---|---|---|---|---|---|---|---|---|---|---|---|
| tin | tout | kps | tps | serv | kps | tps | serv | kps | tps | serv | kps | tps | serv | us | sy | wt | id |
| 0 | 14 | 0 | 0 | 269 | 4 | 0 | 51 | 2 | 0 | 22 | 3 | 0 | 41 | 15 | 3 | 0 | 82 |

Vmstat, on the other hand, generates the output lines:

| procs | memory | | page | | | | | | disk | | | | faults | | | cpu | | |
|---|---|---|---|---|---|---|---|---|---|---|---|---|---|---|---|---|---|---|
| rbw | swap | free | re | mf | pi | po | fr | de | sr | f0 | s0 | s3 | s5 | in | sy | cs | us | sy | id |
| 000 | 60304 | 7320 | 0 | 8 | 3 | 3 | 5 | 0 | 0 | 0 | 0 | 0 | 0 | 159 | 1056 | 283 | 15 | 3 | 82 | while mpstat produces:

| CPU | minf | mjf | xcal | intr | ithr | csw | icsw | migr | smtx | srw | syscl | usr | sys | wt | idl |
|---|---|---|---|---|---|---|---|---|---|---|---|---|---|---|---|
| 0 | 8 | 0 | 0 | 259 | 47 | 283 | 110 | 0 | 0 | 0 | 1055 | 15 | 3 | 0 | 82 |

These utilities may also produce extended outputs, such as the following output of "iostat-x":

| extended device statistics | | | | | | | | | |
|---|---|---|---|---|---|---|---|---|---|
| device | r/s | w/s | kr/s | kw/s | wait | actv | svc_t | % w | % b |
| fd0 | 0.0 | 0.0 | 0.0 | 0.0 | 0.0 | 0.0 | 269.0 | 0 | 0 |
| sd0 | 0.1 | 0.3 | 1.2 | 2.9 | 0.0 | 0.0 | 51.1 | 0 | 0 |
| sd3 | 0.1 | 0.0 | 1.0 | 0.6 | 0.0 | 0.0 | 21.7 | 0 | 0 |
| sd5 | 0.0 | 0.2 | 0.4 | 2.1 | 0.0 | 0.0 | 40.9 | 0 | 0 |
| sd6 | 0.0 | 0.0 | 0.0 | 0.0 | 0.0 | 0.0 | 0.0 | 0 | 0 |
| nfs2 | 0.0 | 0.1 | 0.4 | 1.0 | 0.0 | 0.0 | 387.1 | 0 | 0 |

-continued

| extended device statistics | | | | | | | | | |
|---|---|---|---|---|---|---|---|---|---|
| device | r/s | w/s | kr/s | kw/s | wait | actv | svc_t | % w | % b |
| nfs3 | 0.0 | 0.0 | 0.2 | 0.0 | 0.0 | 0.0 | 34.2 | 0 | 0 |
| nfs442 | 0.0 | 0.0 | 0.0 | 0.0 | 0.0 | 0.0 | 0.0 | 0 | 0 |

It is clear from these examples that the varying output formats of the different utilities prevents them from being combined or compared in an easy, straightforward manner. The utilities do not present a consistent output format from which data can simply be read and averaged.

It should also be noted that, because each of the performance monitoring utilities executes as an independent process, it cannot be guaranteed that the applications will produce a coordinated output. That is, the applications do not take turns in providing their respective lines of output, so the resulting format of the combined outputs may not be repeated consistently. For example, the standard output may consist of a set of outputs from mpstat, one from iostat, another from mpstat, then two sets from iostat. An application which alternates reading in a set of outputs from each application would experience an error if it was used in this situation.

Figure 3:
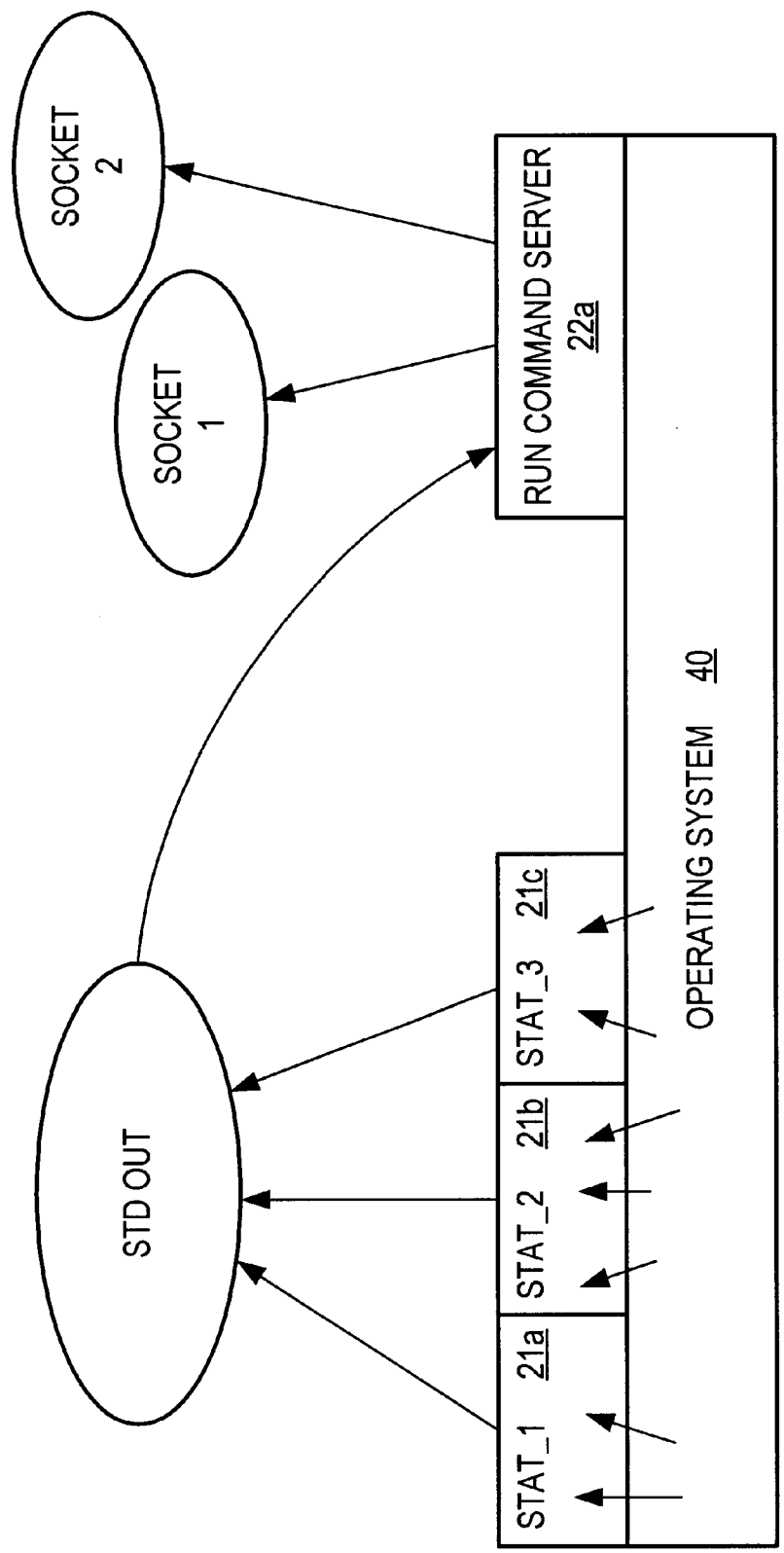
FIG. 3 is a diagram illustrating the operation of the run command server on a target computer.

FIG. 3 is a diagram illustrating the operation of run command server 22a on computer 31. Operating system 40 begins executing when a computer (e.g. 31) is powered up. Performance monitoring utilities 21 are started on computer 31. Each of these applications is designed to obtain certain performance data on the computer, typically by making system calls to operating system 40. The flow of this performance data is illustrated by the arrows extending from operating system 40 to the performance monitoring utilities. The performance data obtained by any one of the applications may overlap with the performance data obtained by one or more of the other applications. Other data may be obtained only by that particular application. Each of the performance monitoring utilities 21 generates output which is sent to the standard output of the computer. Examples of the outputs of these performance monitoring utilities are shown above. If the standard output is not redirected to run command server 22, the output of the applications is normally displayed on the computers monitor.

When run command server 22 is started, the user also redirects the standard output to the run command server. In a UNIX environment, for example, the user can accomplish this by simply "piping" the standard output of the performance monitoring utility to the run command server. The redirection of the standard output is shown graphically in FIG. 3. Run command server 22 creates a thread 24 corresponding to each of the performance monitoring utilities 21 which is executing on the computer. Each time one of performance monitoring utilities 21 outputs a set of performance data to the standard output, that data is redirected to the corresponding thread 24 of run command server 22. Thread 24 takes the output generated by the corresponding performance monitoring utility 21 and sends it to a particular socket which is associated with that thread. In this manner, the run command server essentially creates separate streams of data, each stream corresponding to one of the performance monitoring utilities. Because each of the streams contains the output of only one performance monitoring utility, all of the output transmitted in a particular stream will have a consistent, repeating pattern.

A socket, as referred to herein, is a software object. In the Java programming language, for example, a socket is instantiated from the java.net.Socket class. The socket provides a communications endpoint in an application through which data can be transported in and out of the application and possibly in and out of the associated computer. In a computer connected to a network, a socket is typically associated with a hardware port connected to the network. Thus, when data is conveyed by an application to the socket, the data is conveyed to the associated hardware port and is thereby transmitted to the network. Although each socket is associated with a hardware port, this relationship generally is not exclusive, and several sockets can be associated with a single hardware port. (This hardware port should not be confused with software ports, one of which is exclusively associated with a single socket.) Thus, while run command server 22 directs data from the various performance monitoring utilities 21 onto the network via several independent sockets, all of the data is typically physically transmitted over the same network connection (i.e., over the same wire.) Consequently, the output data of one performance monitoring utility may be interleaved with the output data of another performance monitoring utility as it is transmitted through the network.

By sending the output of the performance monitoring utilities to the various sockets, run command server 22 transmits the data to superserver 23. As noted above, the run command server does not just transmit all of the data which appears on the standard output to the superserver. The data transmitted to the superserver by particular thread (and associated socket) originates from a single one of the performance monitoring utilities. The outputs of the different performance monitoring utilities executing on a particular computer are thereby separated. All of the data on a particular thread will therefore have a consistent, repeating pattern and can be converted to a standardized format in a consistent, repetitive manner.

Superserver 23 receives the data via separate sockets. Each of the sockets is associated with one of the run command server sockets and receives the data transmitted from the run command server via that socket. Thus, even though all of the data output from all of the performance monitoring utilities may be conveyed by a single wire, the outputs of the respective performance monitoring utilities are automatically separated upon receipt by the superserver. Each of the sockets is associated with a separate thread 25 of the superserver. Each thread 25 therefore receives the output of a single one of the performance monitoring utilities. The purpose of threads 25 is simply to receive the output data from run command server and to provide the data to a subsequent thread 27.

Thread 27 takes the received data from thread 25 and filters it. Because the data corresponds to a single one of the performance monitoring utilities, it can be processed using a filter 26 which corresponds to the particular performance monitoring utility 21 that originally generated the data. Each filter 26 is designed to accept data in the format produced by the corresponding utility 21 and convert the data into a standardized format. In one embodiment, this standardized format consists of key-value pairs. The data may be formatted in other ways in alternate embodiments. The keys in this embodiment are predefined and provide a common identifier for data which is produced by the performance monitoring utilities in a variety of formats.

FIG. 4 illustrates the filtering of the output data into key-value pairs. The output 50 of a performance monitoring utility Stat_1 is represented as a two-line output. Field 51 corresponds to a line of identifiers, while fields 52–59 correspond to a series of performance values. Filter 26a is used to convert output 50 into a series of key-value pairs 60–67. Key-value pair 60 consists of a key 60b, a value 60c and an identifier 60a. In this case, identifier 60a identifies the performance monitoring utility from which the key-value pair was generated.

FIG. 5 illustrates the filtering of output data from a second performance monitoring utility into key-value pairs. The output 70 of a second performance monitoring utility Stat_2 is represented as a three-line output. Fields 71 and 72 correspond to two lines of identifiers, while fields 73–79 correspond to a series of performance values. Filter 26b is used to convert output 70 into a series of key-value pairs 80–86. Key-value pair 80 consists of a key 80b, a value 80c and an identifier 80a. it should be noted that the filtering of output 70 does not in this case produce the same set of key-value pairs as the filtering of output 50, although there is some overlap. In other instances, the sets of key-value pairs may be completely overlapping, or there may be no overlap at all.

Each filter 26 is designed to be used with a particular performance monitoring utility. The filter accepts input in the format generated by the corresponding performance monitoring utility and produces key-value pairs which can be derived from the output of that performance monitoring utility. If the performance monitoring utility is changed so that it generates a different output than the previous version, the filter must also be modified to accept the new output. The filter may handle the output of the performance monitoring utility in various ways to produce the key-value pairs. The filter may simply associate the performance monitoring utility output values with particular keys, or the output values may be manipulated mathematically to produce the values associated with the keys. For example, the values may be normalized, or values for parameters which are not included in the output may be calculated.

In FIGS. 4 and 5, identifiers 60a and 80a specify only the performance monitoring utility from which the data originated. In another embodiment, the identifiers may specify not only the performance monitoring utility, but also the computer from which the value was obtained. When the key-value pairs are used by a client, the key allows the identification of the type of information which is being made available. The computer name allows the user to discriminate between individual computers and select data from the particular machines in which he or she is interested. With this information, the user can determine particular performance parameters of a single computer or a particular cluster of computers.

As the data is filtered and converted into key value pairs, the key value pairs are passed on to thread 28. Thread 28 directs the key-value pairs to another socket which makes the key-value pairs available to client applications 29. The key-value pairs are directed to the respective sockets as they are generated. Because more than one socket may correspond to a physical connection (e.g., port) on the computer, and because the outputs of the different performance monitoring utilities are not synchronized, the key-value pairs associated with one socket may be interspersed with the key-value pairs associated with another socket. Client applications 29 are configured to handle the key-value pairs independently, so the applications are not affected by the fact that the data from different performance monitoring utilities may be intermixed. In other words, although the client applications "see" all of the key-value pairs output by the superserver, they are configured to select and use the pairs of interest and disregard the others. In this embodiment, the key-value pairs are "made available" by sending them to each of the sockets to which client applications are connected, rather than sending the data to a particular computer. This allows additional client applications to be started and used to analyze the data.

Client applications 29 are used to view the performance of the computers based on the key-value data. Client applications 29 may select data corresponding to particular computers or clusters of computers on the network. Client applications 29 may also select particular key-value pairs for the chosen computers. The selected data for the selected computers can then be displayed graphically or textually to show the performance of the selected computers. Any data which is not used by one of the client application is simply discarded.

Client application 29 can be any application which is configured to utilize the key-value pairs generated by superserver 23. In one embodiment, client 29 utilizes an off-the-shelf GUI (Graphical User Interface). The client application receives the key-value pairs as they are output by the superserver and hashes the key-value pairs into a table so that they can be quickly accessed. The client replaces the old key-value pairs with the newly-received key-value pairs. The GUI is configured to overwrite the current display data with graphical data corresponding to the newly-received key-value pairs.

The GUI is adapted to select particular performance parameters from selected computers and display the associated data in the form of a bar graph. The bar graph is periodically updated to reflect new key-values which are received from the superserver. In one embodiment, client application 29 is configured to display a list of the keys for which key-value pair data is available. The user can highlight selected ones of the keys from the list. The key-value pairs corresponding to the selected keys are then graphically represented to the user in a bar chart. In other embodiments, the performance of the selected computers may be displayed in other graphical formats or as textual data (e.g., a list of the selected performance parameters).

Client applications may be configured to display information regarding individual parameters or computers, groups of parameters or computers, or combinations thereof. Client applications may display the data values contained in the key-value pairs, or the data may be manipulated in different ways before it is displayed. For example, the data for a group of computers may be averaged, or the peak value may be chosen for display. The arrival of the various key-value pairs may not be synchronized, so a new value for a particular key (and the corresponding displayed data) may be updated as it is received, or when other keys are updated.

In one embodiment, the system is implemented using the Java programming language. (It is contemplated that other embodiments may utilize other programming languages.) The run command server, superserver and client application are Java applications running on the target computer, filtering computer and client computer, respectively. The system is started by starting the superserver and run command server(s) either at boot time via the system launching process or by manually starting the superserver and run command server(s). Launching the performance monitoring utility(s) and respective filter(s) is administratively initiated by another command (called PerfMon in one embodiment) after the superserver and run command server(s) are running. This command tells the superserver to use a particular filter and notifies the run command server on a given target computer that it needs to run the performance monitoring utility associated with the particular filter.

Every time the administrator command is executed and a new performance monitoring utility is started, the superserver and run command server(s) construct a new IO stream infrastructure. This infrastructure associates the filter with the performance monitoring utility to be started on the target computer. The superserver does this by creating three threads. The first "listens" on a socket for incoming data (from the run command server) and transfers any incoming data to the second thread. The second thread accepts the data and filters it according to the associated filter to produce key-value pairs (the filter is started in an independent process). The third thread takes the key-value pairs and conveys them to a socket associated with listening client applications. (It should be noted that if there are no clients listening for the data, the data is simply disregarded. If there are one or more clients listening for data, the superserver sends the data to each of the listening clients across its associated/respective socket.) The three threads thus form a communication path from the run command server to the client application, wherein the data is also transformed into key-value pairs.

The superserver notifies a particular run command server that it must run a particular performance monitoring utility. The run command server spawns the performance monitoring utility as a new process and redirects its output to a thread which in turn sends its output to the superserver. Whenever data is output by the performance monitoring utility, the thread redirects it to the unique input socket of the superserver (as represented by, e.g., the line connecting 24a and 25a in FIG. 2).

The graphical interface is started when a client wishes to view a cluster's performance monitoring utility data. When the client application starts, the client connects to a well known port of the superserver. This action causes the superserver to place the new socket into the list of client sockets wishing to receive data. Thus, when data is output by the performance monitoring utility, it is passed by the run command server to the superserver, where it is collected by the first thread, filtered by the second thread, and passed by the third thread to the client application as key-value pairs.

Additional performance monitoring utilities may be started on the target computer. When the first performance monitoring utility connects to the input socket of the run command server, another socket is created so that one handles the data and the other listens for newly started performance monitoring utilities. When additional performance monitoring utilities are started, the process is repeated and a new thread is created to handle the data from each added utility. Likewise, a new set of three threads is created in the superserver to handle each new thread in the run command server. (A run command server and a performance monitoring utility may also be started on a new computer.) When a performance monitoring utility is terminated, portion of the communication infrastructure is destroyed.

Additional client applications may also be started and used in the system. Just as the run command server has a socket which listens for new performance monitoring utilities, the superserver has a socket which listens for new clients. When a new client application connects to the superserver, a corresponding socket is created and this socket is added to a list of sockets to which the key-value pairs are conveyed. When one of the client applications is terminated, the corresponding portion of the communication infrastructure is destroyed.

While the present invention has been described with reference to particular embodiments, it will be understood that the embodiments are illustrated and that the invention scope is not so limited. Any variations, modifications, additions and improvements to the embodiments described are possible. These variations, modifications, additions and improvements may fall within the scope of the invention as detailed within the following claims.

What is claimed is:

1. A method for monitoring the performance of selected computers on a network comprising:

executing a first performance monitoring utility on a first computer and a second performance monitoring utility on a second computer, said first performance monitoring utility generating output data in a first format and said second performance monitoring utility generating output data in a second format, wherein said first format and said second format each include one or more numeric fields and wherein said first format and said second format are different;

filtering said output data of said first performance monitoring utility using a first filter and filtering said output data of said second performance monitoring utility using a second filter, wherein said first filter producing a first set of key-value pairs and said second filter producing a second set of key-value pairs, wherein said first set of key value pairs and said second set of key value pairs are formatted in the same way;

providing said first and said second sets of key-value pairs to a client computer, and executing a client application on said client computer, said client application selecting and displaying said performance of said first computer based on said first set of key-value pairs and selecting and displaying said performance of said second computer based on said second set of said key-value pairs.

2. The method as recited in claim 1, wherein said filtering includes associating each of said one or more numerical fields with a corresponding key and calculating one or more values from each of said one or more numerical fields and associating each of said one or more values with one of said corresponding keys to produce said key-value pairs.

3. The method as recited in claim 1 further comprising creating a first thread corresponding to said first performance monitoring utility and a second thread corresponding to said second performance monitoring utility, and directing said output data of said first performance monitoring utility to said first thread and directing said output data of said second performance monitoring utility to said second thread.

4. The method as recited in claim 3 further comprising directing said output data corresponding to said first thread to a first socket and directing said output data corresponding to said second thread to a second socket.

5. The method as recited in claim 4 further comprising a third socket receiving said output data directed to said first socket and a fourth socket receiving said output data directed to said second socket.

6. The method as recited in claim 5 further comprising a third thread filtering said output data received by said third socket using said first filter and a fourth thread filtering said output data received by said fourth socket using said second filter.

7. The method as recited in claim 1, wherein said first performance monitoring utility and said second performance monitoring utility are pre-existing utilities which generate output data at standard outputs of said first and second computers respectively.

8. A system for monitoring the performance of selected computers on a network, said system comprising:

a first computer coupled to said network and configured to execute a first performance monitoring utility, said first performance monitoring utility generating output data in a first format including one or more numeric fields and to direct said output data to a standard output of said first computer;

a second computer coupled to said network and configured to execute a second performance monitoring utility, said second performance monitoring utility generating output data in a second format including one or more numeric fields and to direct said output data to a standard output of said second computer;

a filtering computer coupled to said first and said second computers and configured to generate performance data by filtering said output data of said first performance monitoring utility using a first filter and filtering said output data of said second performance monitoring utility using a second filter;

wherein said first filter producing a first set of key-value pairs and said second filter producing a second set of key-value pairs, wherein said first set of key value pairs and said second set of key value pairs are formatted in the same way;

a client computer coupled to said filtering computer and configured to select and display said performance of said first computer based on said first set of key-value pairs and to select and display said performance of said second computer based on said second set of said key-value pairs.

9. The system as recited in claim 8, wherein said filtering computer is further configured to associate each of said one or more numerical fields with a corresponding key and calculating one or more values from each of said one or more numerical fields and associating each of said one or more values with one of said corresponding keys to produce said key-value pairs.

10. The system as recited in claim 8, wherein said first computer is further configured to create a first thread corresponding to said first performance monitoring utility and to direct said output data of said first performance monitoring utility to said first thread.

11. The system as recited in claim 10, wherein said first computer is further configured to direct said output data corresponding to said first thread to a first socket.

12. The system as recited in claim 11, wherein said second computer is further configured to create a second thread corresponding to said second performance monitoring utility and to direct said output data of said second performance monitoring utility to said second thread.

13. The system as recited in claim 12, wherein said second computer is further configured to direct said output data corresponding to said second thread to a second socket.

14. The system as recited in claim 13, wherein said filtering computer is further configured to receive said output data directed to said first socket at a third socket and to receive said output data directed to said second socket at a fourth socket.

15. The system as recited in claim 14, wherein said filtering computer is further configured use a third thread and said first filter to filter said output data received by said third socket and to use a fourth thread and said second filter to filter said output data received by said fourth socket.

16. The system as recited in claim 8, wherein said first performance monitoring utility and said second performance monitoring utility are pre-existing utilities.

\* \* \* \* \*